United States Patent Office 3,278,961
Patented Oct. 18, 1966

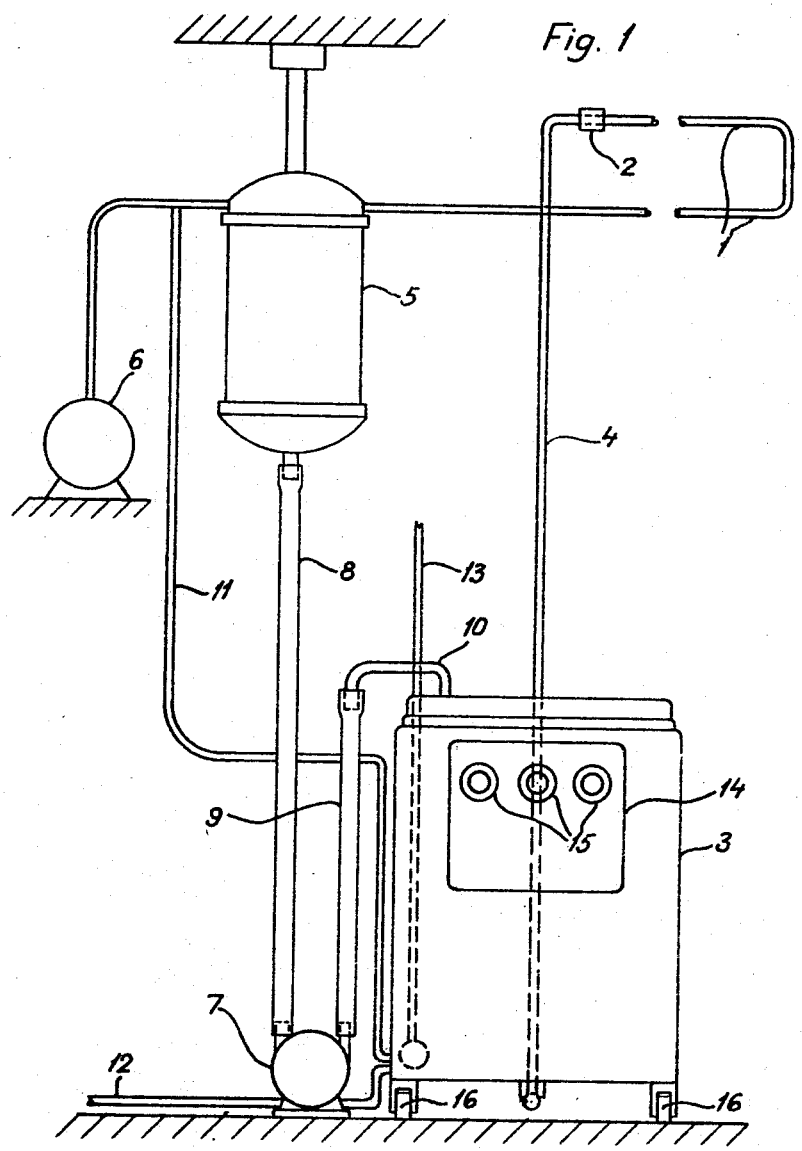

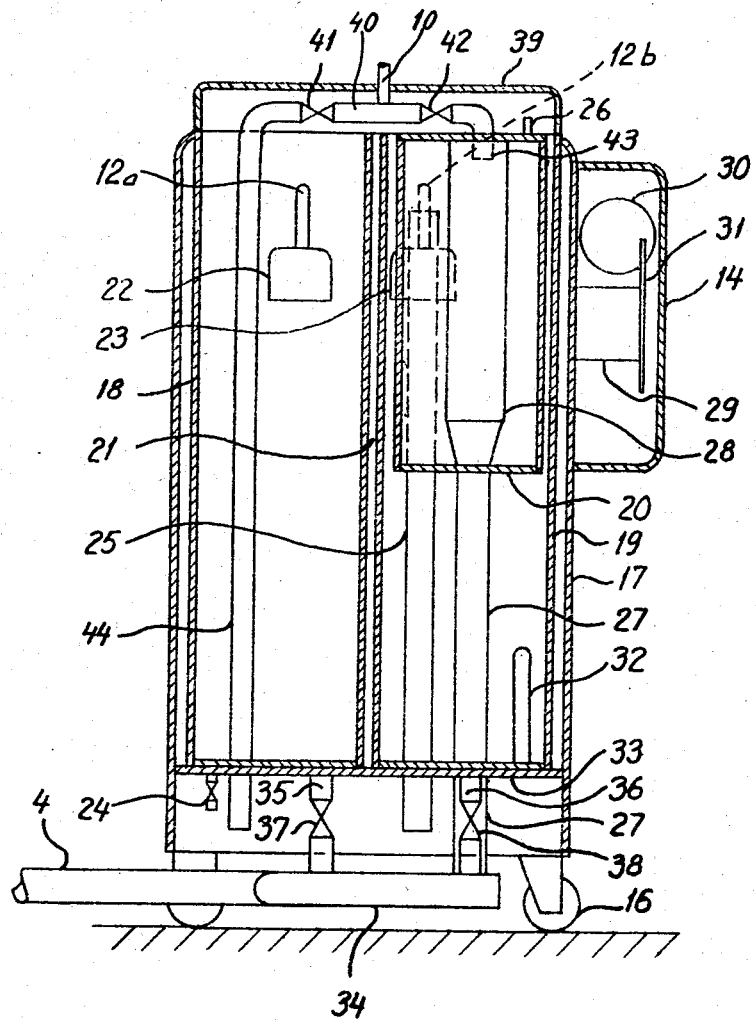

3,278,961
WASHING APPARATUS FOR PIPELINES
Stig Åke Gösta Svensson, Sodertalje, Sweden, assignor to Alfa-Laval AB, Tumba, Sweden, a corporation of Sweden
Filed Dec. 29, 1964, Ser. No. 421,775
Claims priority, application Sweden, Jan. 8, 1964, 142/64
5 Claims. (Cl. 15—3.51)

Modern machine milking plants require a technically skilled and careful staff for satisfactory operation. Since it can be difficult to procure such a staff, it is necessary to eliminate, as much as possible, the influence of the human factor on the operation of the plant.

An object of the present invention is to make the washing of the plant automatic in such a way that a relatively unqualified staff will be able to attend to the washing in a satisfactory manner. Furthermore, the invention has for its object to provide a compact and easily transportable washing unit, which with a minimum of work can be installed in the place where it is to be used.

These objects are attained according to the invention by a washing apparatus for pipelines, especially pipelines in milking plants, which is programmed to subject the pipeline to a pre-flushing with water, a washing with a washing liquid and an after-flushing with water and possibly a discharge of remaining liquid by means of plugs. In the new apparatus, the containers, pipelines, valves and the programming means are united into a compact, displaceable unit, preferably in the form of a housing, which is provided with connections for cold water, electric current and possibly vacuum and with connections to the ends of the pipeline to be washed. Two containers, one for flushing water and one for washing liquid, are connected to the cold water pipeline by means of connections, provided with float valves, and the washing liquid container is provided with a thermostat-controlled, electric heating element.

Since it is desired to have a compact design, only two containers have been provided, the flushing water container serving to deliver tepid water for the pre-flushing and cold water for the after-flushing. The water in the flushing water container is warmed from the washing liquid container by heat emission. The washing liquid is kept, by the heating element, at a suitable temperature such as 65° C. This may result in the flushing water reaching too high a temperature. Since the temperature of the water in the pre-flushing is not allowed to exceed 35° C. and suitably should be 25 to 30° C. (having regard to coagulation of the proteins in the milk residues to be flushed away), the two containers are, according to an additional feature of the invention, heat-insulated against each other as by means of an air slot separating them. However, since the cold water temperature as well as the air temperature vary with the season, it is not always possible to keep the flushing water temperature within the desired interval. For this reason the flushing water container is provided with a permanently open outlet with a small, controllable throughflow area. Heat excess supplied to the flushing water container is led off by means of the permanently outflowing water, the removed water being simultaneously replaced by a supply of cold water through the float valve. The desired flushing water temperature is obtained by a control of the above-mentioned controllable throughflow area.

According to an additional feature of the present invention, the washing liquid container is provided with an overflow outlet. In this way, a desired partial renewal of the washing liquid from one washing occasion to the other is ensured, as will be explained later.

The invention is explained more in detail below with reference to the accompanying drawings in which:
FIG. 1 is a schematic view of an embodiment of the apparatus inserted into a pipeline milking plant, and
FIG. 2 is a vertical sectional view, partly in elevation, of the apparatus.

In FIG. 1, the milk pipeline to be washed in the milking plant is designated at 1. One end of the pipeline is connected to the washing apparatus 3 by means of a connection member 2 and a pipeline 4, which issues from the bottom of the apparatus. The other end of the milk pipeline is connected to a milk interceptor vessel 5, and the latter is in its turn connected to a vacuum pump 6, operating during the whole milking and washing course. In the milk interceptor vessel there can be provided electric contacts or other members (not shown) which start an electric pump 7, when liquid reaches a certain level in the milk interceptor vessel. A hose 8 connects the bottom of the milk interceptor vessel to the pump 7, which by means of another hose 9 is connected to an inlet pipe 10 of the washing apparatus. Furthermore, the washing apparatus has a vacuum connection 11 leading to the vacuum pump 6, a cold water connection 12 and an electric connection 13. The washing apparatus is also provided with a housing 14, which encloses the programming means and on the outside of which the control members 15 for the operation of the washing apparatus are fitted. Finally, the washing apparatus is shown as movable on trundles 16.

According to FIG. 2, the washing apparatus 3 comprises a housing 17, which encloses a flushing water container 18 and a washing liquid container 19. These two containers have an open connection to the outer atmosphere. An air container 20 is immersed in the upper part of the latter container, and the housing 14 of the programmer is provided on the outside of the housing 17. The front end walls of the housings 17 and 14 and of the containers 18, 19 and 20 are, for the sake of clearness, shown as removed.

The containers 18 and 19 are separated by means of an air slot 21 and each provided with a float valve 22 and 23, respectively, which, when the liquid level in the containers sinks, admits water from the cold water pipeline 12 of FIG. 1, as shown at 12a and 12b in FIG. 2. The bottom of the container 18 is provided with an outlet valve 24, having a small, controllable throughflow area. The container 19 is provided with an overflow outlet in the form of a vertical pipe 25 which, together with the valve 23, is arranged behind the container 20. The latter is in its turn closed against the outer atmosphere with the exception of a small, permanently open throttle opening 26. Furthermore, a vertical pipe 27 is provided in the container 19. The upper wider part 28 of this pipe is located in the container 20, and the upper end of this pipe can be closed vacuum-tightly by means of a cover (not shown). Pipe 27–28 serves to supply plugs, such as foam plastic plugs, to the pipeline 4 and thus to the milk pipeline 1 to facilitate cleaning in the known manner; and it is provided with a pulsator (not shown) for an intermittent supply of air to the milk pipeline as well as a stop (not shown), which may be controlled by the programmer. This stop releases, at a desired point of time, a number of plugs stored in the pipe part 28, so that they are supplied to the pipeline 1. The amount of air which the pulsator each time admits into the pipeline 1 is determined substantially by the volume of the container 20.

In the housing 14 there are provided a program roller 29 and a pulsator 30, which by means of a ratchet device 31, causes the roller 29 to revolve about two revolutions per hour. A thermostat-controlled, electric heating element 32 is provided in the washing liquid container 19.

The housing 17 has a bottom 33, which supports the containers 18 and 19. The overflow outlet pipe 25 opens into the outer atmosphere a distance below the bottom 33, while the pipe 27 is connected to the pipeline 4. In front of the righthand part of this pipeline is provided a pipeline piece 34. This opens into the pipeline 4. Outlets 35 and 36 from the containers 18 and 19 are provided in the bottom 33. These outlets are provided with valves 37 and 38, and they open into the pipeline piece 34. The housing 17 is provided with a cover 39. Below this cover there is provided a pipeline piece 40 connected to the pipe 10 and having two valves 41 and 42. The righthand end 43 of the pipeline piece opens into the container 19 (behind the container 20), while the left-hand end of the pipeline piece is connected to a vertical pipe 44, which passes through the container 18 and opens into the outer atmosphere below the bottom 33.

The washing apparatus operates in the following manner:

After the cows have been milked, the pipeline 4 is connected to the one end of the milk pipeline 1 and the hose 9 is connected to the inlet pipe 10. The other connections 11, 12 and 13 are stationary. The vacuum pump is supposed to continue running after the cows have been milked, and air is admitted intermittently into the pipeline 1 in the manner stated earlier during the complete washing as well as flushing courses. The container 18 contains flushing water, controlled to have a temperature of 25 to 30° C. by means of the outlet 24, and the container 19 contains washing liquid, to which has been added a washing agent to the desired concentration and which is controlled to have a temperature of about 65° C. by the heating element 32 provided with a thermostat.

The programmer in sub-housing 14 is started and effects automatically by means of a pneumatic influence (vacuum operation) an adjustment of the valves 37, 38, 41 and 42 in such a way that the different stages of the washing course take place. First, the whole amount of tepid flushing liquid, which is contained in the container 18, is sucked into the pipeline 1, the intermittent air admissions improving the flushing of the inside of the pipeline. When the flushing water after having passed the pipeline 1 arrives at the milk interceptor vessel 5, which is permanently subjected to vacuum, the water rises in the latter, until it reaches an electric contact (not shown) in the interceptor vessel. As a result, the pump 7 is started, and the water in the milk interceptor vessel is pumped out against the atmospheric pressure through the pipeline 9-10, the valve 41 and the discharge pipe 44. Substantially all of the flushing water passes this way. The pump 7 stops when the water level has sunk down to an electric contact (not shown) in the bottom of the milk interceptor vessel. Meanwhile new cold water flows into the container 18 through the float valve 22, so that this container is filled, when an after-flushing of the pipeline 1 has to take place.

After the pre-flushing (which requires a time of, for instance, 4 minutes) comes a period of, for example, 2 minutes, during which only air is sucked through the pipeline 1 from the pulsator (not shown) on the pipe 27. Thereafter washing liquid of 65° C. is sucked from the container 19 through valve 38 into the pipeline 1 but while recirculating through the valve 42 to the same container, with valve 41 closed. This washing period lasts about 11 minutes, thereafter the pump 7 is stopped. Meanwhile cold water flows into the container 19 through the float valve 23. Excess of liquid flows away through the overflow outlet 25. A certain amount of washing liquid remains in the milk interceptor vessel. In this way there is caused a loss of the original washing liquid of 20 to 25%, which is compensated by cold water. This brings about a desired successive renewal of the washing liquid in each washing operation, a corresponding amount of fresh washing agent being added.

After the washing operation, air is again blown through during about 3 minutes. Thereafter the cold water, which again has been collected in the container 18 and has not yet been warmed, is sucked through the pipeline 1 via valve 37 and then pumped out through the pipe 44. This after-flushing or so-called cold flushing requires a time of about 5 minutes. After the cold flushing, air is again sucked through the pipeline 1 during about 4 minutes. During this period the foam plastic plugs contained in the pipe piece 28 are released and sucked away through the pipeline 4 and into the pipeline 1. Due to the fact that the plugs have a diameter somewhat larger than the interior diameter of the pipeline 1, the water residues in the pipeline 1 are driven out. Finally, the programmer stops the vacuum pump 6 and the washing cycle is finished.

I claim:

1. Washing apparatus for a pipeline, which comprises a transportable housing having two containers, one for washing liquid and the other for flushing liquid, a connection for supplying water to each container, a float valve in each container for controlling its water connection, a thermostatically-controlled electric heating element in the washing liquid container, the housing also having a first pipe adapted for connection to one end of said pipeline and a second pipe adapted for connection to the opposite end of said pipeline, an outlet connection from each container to said first pipe, an outlet valve in each outlet connection, an inlet connection from said second pipe to the washing liquid container, an inlet valve in said inlet connection, a discharge connection from said second pipe, and a discharge valve in said discharge connection, whereby said valves are operable alternately for passage of water from the flushing container through said pipeline and back to said discharge connection and for circulation of liquid from the washing container through said pipeline and back to said washing container.

2. Apparatus according to claim 1, in which the two containers are heat-insulated from each other.

3. Apparatus according to claim 1, in which the flushing liquid container has a separate valve-controlled outlet.

4. Apparatus according to claim 1, in which the washing liquid container has an overflow outlet.

5. Apparatus according to claim 1, comprising also a plug-holding pipe in the housing leading downwardly to said first pipe.

References Cited by the Examiner

UNITED STATES PATENTS

| | | | |
|---|---|---|---|
| 774,461 | 11/1904 | Wolf. | |
| 2,079,989 | 5/1937 | Delano | 134—57 |
| 2,893,407 | 7/1959 | Babson | 134—95 XR |
| 3,072,503 | 1/1963 | Baum | 15—3.51 XR |

CHARLES A. WILLMUTH, *Primary Examiner.*

R. L. BLEUTGE, *Assistant Examiner.*